(12) United States Patent
Kurosawa et al.

(10) Patent No.: US 7,723,937 B2
(45) Date of Patent: May 25, 2010

(54) DRIVE CONTROL DEVICE OF MOTOR AND A METHOD OF START-UP

(75) Inventors: Minoru Kurosawa, Tokyo (JP); Yasuhiko Kokami, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 396 days.

(21) Appl. No.: 11/871,343

(22) Filed: Oct. 12, 2007

(65) Prior Publication Data

US 2008/0100243 A1    May 1, 2008

(30) Foreign Application Priority Data

Oct. 31, 2006    (JP) .............................. 2006-295056

(51) Int. Cl.
*H02P 6/18* (2006.01)
(52) U.S. Cl. ........................... 318/400.34; 318/400.32; 318/432; 318/430; 318/431
(58) Field of Classification Search ............ 318/400.34, 318/400.32, 432, 430, 431
See application file for complete search history.

(56) References Cited

U.S. PATENT DOCUMENTS

| | | | |
|---|---|---|---|
| 6,340,873 B2 | 1/2002 | Seki et al. | |
| 7,071,640 B2 | 7/2006 | Kurosawa et al. | |
| 2006/0082336 A1 | 4/2006 | Kurosawa et al. | |

FOREIGN PATENT DOCUMENTS

| | | |
|---|---|---|
| JP | 2001-275387 | 10/2001 |
| JP | 2004-140975 | 5/2004 |
| JP | 2006-115599 | 4/2006 |

*Primary Examiner*—Bentsu Ro
*Assistant Examiner*—Erick Glass
(74) *Attorney, Agent, or Firm*—Mattingly & Malur, P.C.

(57) ABSTRACT

A motor drive control device and motor startup method prevent startup noise and reduce startup time. At startup, a current to which a rotor does not react is passed through two phase coils of a polyphase DC motor in succession, and a voltage polarity induced in a non-conducting phase is detected. A first operation decodes the detected signal, and determines phase coils of the motor through which a current should pass to rotate the rotor and the energization direction. A second operation forms a control signal for passing a current according to the determination to drive the motor, detects a voltage peak induced in the non-conducting phase during the drive, and performs switching control of a conducting phase. In normal operation, the position of the rotor is detected based on a back EMF in each phase, and rotation control is performed.

13 Claims, 11 Drawing Sheets

CONDUCTION FROM V TO W PHASE

CONDUCTION FROM W TO V PHASE

DRIVE CONTROL DEVICE OF MOTOR AND A METHOD OF START-UP

CROSS-REFERENCE TO RELATED APPLICATIONS

The disclosure of Japanese Patent Application No. 2006-295056 filed on Oct. 31, 2006 including the specification, drawings and abstract is incorporated herein by reference in its entirety.

BACKGROUND OF THE INVENTION

The present invention relates to a technique effective when applied to a drive control technique for a brushless motor and startup control of a three-phase DC motor, and to a technique effective when applied to a drive control device of a spindle motor for rotationally driving a storage medium in a disk storage device such as a hard disk drive (HDD).

A brushless three-phase DC motor generally called a spindle motor is used to rotate a magnetic disk as a storage medium in a hard disk drive. The magnetic disk is rotated at high speed by the spindle motor, and a magnetic read/write head is brought close to the surface of the rotating magnetic disk and moved in a radial direction to write or read information. The following method has been conventionally used in drive control of a brushless motor: the positional relationship between a rotor and a stator is detected using a Hall element; a coil phase at which energization is to be started is determined from the detected positional relationship to prevent the reverse rotation of the motor.

However, providing the motor with a rotor position detector using a Hall element makes it difficult to downsize the device; therefore, a sensorless motor has come into greater use in the hard disk drive. In such a sensorless motor, uncertainty about the positional relationship between the rotor and the stator at the time of starting rotation may cause reverse rotation of the rotor. To cope with this, the present applicant has previously proposed the following control method: a pulse current of such a short duration that the rotor does not react is passed through any two phase coils; the polarity of an induced voltage that appears in a non-conducting phase is detected to determine the positional relationship between the rotor and the stator; the characteristic that the polarity of an induced voltage switches every 180 electrical degrees is utilized to determine a phase at which energization should be started; whereby reverse rotation of this sensorless motor at its start-up is avoided (see Japanese Unexamined Patent Publication No. 2001-275387, Japanese Unexamined Patent Publication No. 2004-140975, and Japanese Unexamined Patent Publication No. 2006-115599).

SUMMARY OF THE INVENTION

A motor startup method of Japanese Unexamined Patent Publication No. 2006-115599 will be described with reference to FIGS. 9A and 9B to FIG. 13. The sum of a voltage Vm+ induced in a non-conducting phase (U phase) when a pulse current of such a short duration that the rotor does not react is passed through two phases (e.g., V phase→W phase) as shown in FIG. 9A and a voltage Vm− induced in the non-conducting phase when a current is passed in the reverse direction (e.g., W phase→V phase) as shown in FIG. 9B becomes an induced voltage (normalization) shown in FIG. 11. The polarity of the induced voltage switches every 180 electrical degrees, and the phase thereof is 90 electrical degrees ahead of that of the back electromotive force (normalization) shown in FIG. 10.

FIG. 12 shows summarizing the relationship among the back electromotive forces (BEMF) of the three phases U, V, W and the polarities of the three-phase induced voltages Eu, Ev, Ew. Based on a combination of polarities (positive/negative) of the three-phase induced voltages Eu, Ev, Ew, the position of the rotor can be identified in steps of 60 electrical degrees. For example, in the case where the polarities of the induced voltages Eu, Ev, Ew of the U, V, W phases are positive, positive, negative, respectively, the rotor is found to be located between 0 and 60 electrical degrees. Accordingly, if an output current is passed from the U phase to the V phase, a normal rotation torque is generated so that the rotor can be normally rotated.

Using these induced voltage polarities (positive/negative), initial accelerating is performed with timing shown in FIG. 13. First, a pulse current of such a short duration that the rotor does not react is passed in turn as shown in the enlarged part of FIG. 13, so that the induced voltage polarities for the U, V, W phases (three-phase sense) are detected. The motor is driven (energized) for a predetermined time period through the use of optimum conducting phases shown in FIG. 12 in accordance with these induced voltage polarities. The alternation between detection of induced voltage polarities and energization through the use of optimum phases is repeated for initial acceleration of the motor until the predetermined number of times or the predetermined number of rotations is reached.

In the initial acceleration, there occurs a large torque ripple consisting of no torque during a detection period (three-phase sense period) and a torque according to a drive current during an energization period as shown in FIG. 13. Consequently, noise of a frequency determined by the sum total of the detection period and the energization period occurs during the initial acceleration of the motor. In an application where startup and stop of the motor are alternated frequently, a use in a relatively quiet environment, and a motor use in a hand-held device used close to a user's ear, such noise at motor startup grates on the ear. Further, since a driving torque cannot be generated during the detection period, an average torque during the initial acceleration is decreased. Consequently, there is a problem that a startup time to a predetermined rotation speed increases correspondingly.

It is an object of the present invention to provide a motor drive control device and a motor startup method which can prevent startup noise and reduce startup time. The above and other objects and novel features of the present invention will be apparent from the description of this specification and the accompanying drawings.

According to one aspect of the invention, an initial-acceleration controller which is activated at start-up performs a first operation in which such a current that a rotor does not react is passed through any two phase coils of a polyphase DC motor in succession by an output drive controller, a polarity of a voltage induced in a non-conducting phase is detected by a phase voltage detector, a signal detected by the phase voltage detector is decoded, and phase coils of the polyphase DC motor through which a current should be passed to rotate the rotor and the direction of energization are determined. The initial-acceleration controller performs a second operation in which a control signal for passing a current according to the determination of the phase coils and the direction of energization in the first operation is formed to rotate and start up the rotor, a peak of voltages induced in the non-conducting phase depending on the slope of a phase current is detected by the phase voltage detector, and the switching control of a conducting phase is performed. After the initial acceleration of the motor by the first and second operations, the position of the rotor is detected based on a back electromotive force in each phase which is generated by rotation of the motor through the phase voltage detector, and rotation control is performed by the output drive controller.

According to this aspect, in the first operation, the direction of rotation is determined based on the detected position of the rotor, and in the second operation, continuous energization is performed in accordance with the detected position of the rotor, using non-conducting-phase induced voltage, so that noise due to torque variation can be prevented and startup time can be reduced.

DETAILED DESCRIPTION OF THE PREFERRED EMBODIMENTS

Figure 1:
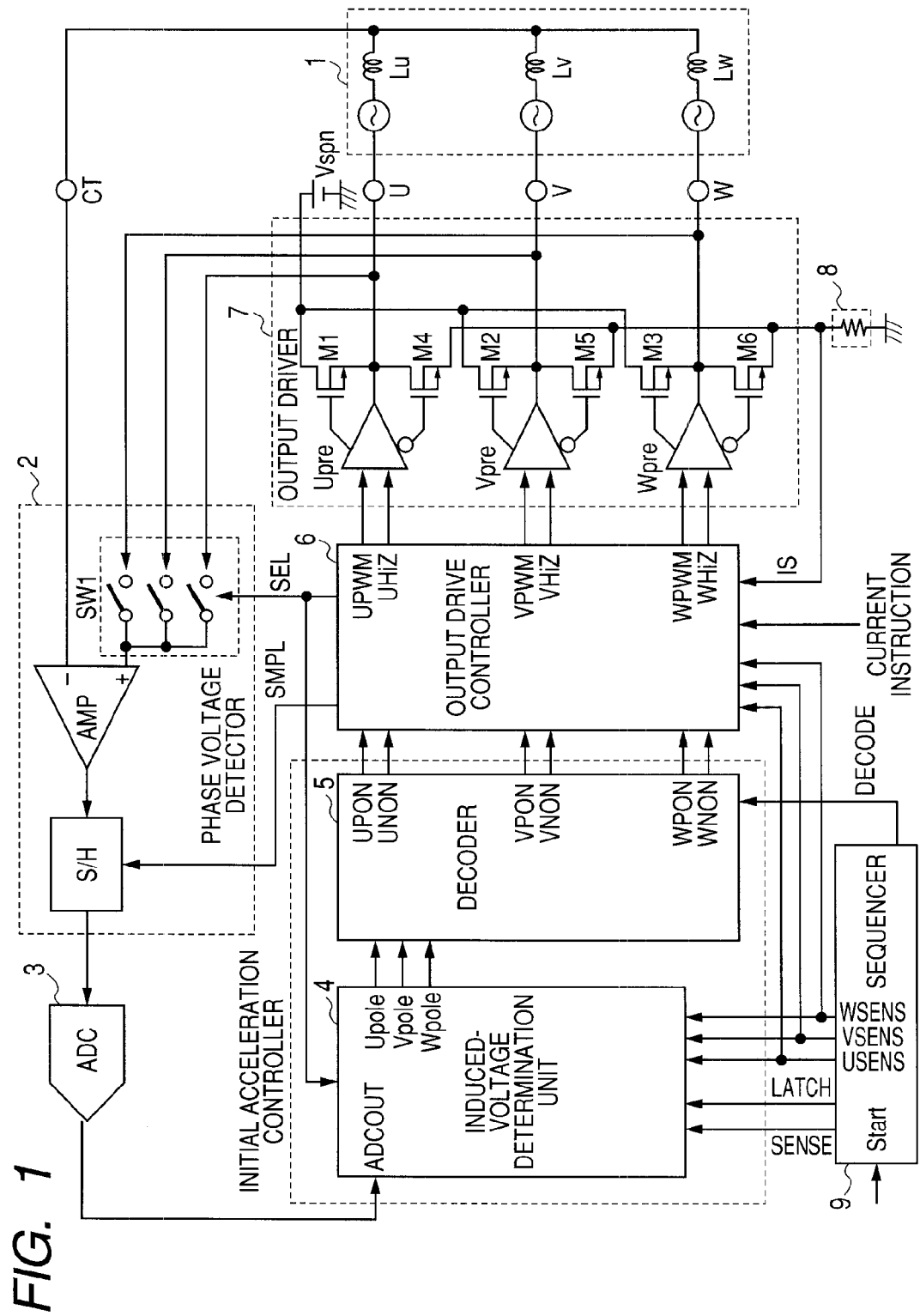
FIG. 1 is a block diagram showing a startup-related section of a motor drive control device according to an embodiment of the present invention.

FIG. 1 is a block diagram showing a startup-related section of a motor drive control device according to an embodiment of the present invention. Motor coils Lu, Lv, and Lw of a three-phase motor 1 are PWM-driven by an output driver 7. The output driver 7 is composed of power MOSFETs M1 to M6 and spindle output predrivers Upre, Vpre, Wpre. An output drive controller 6 generates output control signals UPWM, UHIZ, VPWM, VHIZ, WPWM, and WHIZ, which are inputted to the spindle output predrivers Upre, Vpre, and Wpre.

A DC shunt resistor 8 is used to detect a motor drive current. That is, the DC shunt resistor 8 provided between the common junction point of the power MOSFETs M4, M5, and M6 in the lower part of an output stage and a circuit ground detects a voltage IS, a sense amplifier included in the output drive controller 6 amplifies the detected voltage IS, and an analog-to-digital converter converts the amplified signal into a digital signal. A current controller included in the output drive controller 6 calculates an error, based on an A-D converted detection value ADCD and a current instruction. With a current control loop composed of the current controller, a PWM signal generator, an output controller, the output stage, the motor, the DC current detector 8, and the analog-to-digital converter ADC, a PWM signal having a duty ratio such that a motor drive current coincides with the current instruction is generated by the PWM signal generator.

In this embodiment, there are provided a phase voltage detector 2, an ADC (analog-to-digital converter) 3, an induced-voltage determination unit 4, a decoder 5, and a sequencer 9. The induced-voltage determination unit 4 and the decoder 5 constitute an initial-acceleration controller. The phase voltage detector 2 is composed of a switch (selector) SW1 for selecting a voltage corresponding to each phase U, V, or W, an amplifier AMP, and a sample-and-hold circuit S/H. The sequencer 9 receives a start signal (Start) and forms various control signals required for the operations of the induced-voltage determination unit 4, the decoder 5, and the output drive controller 6 at start-up.

The induced-voltage determination unit 4 detects an induced voltage in a non-conducting phase with respect to the center point CT of the motor coils Lu, Lv, and Lw. The non-conducting phase is selected by the phase voltage detector 2 under the control of the decoder 5 and the output drive controller 6. The ADC 3 converts the induced voltage into a digital signal ADCOUT. The induced-voltage determination unit 4 outputs output signals Upole, Vpole, and Wpole corresponding to the polarity detection result of the induced voltage or the peak detection result of the induced voltage, as described later. The decoder 5 determines conducting phases, based on the output signals Upole, Vpole, and Wpole of the induced-voltage determination unit 4, and outputs upper and lower ON signals UPON, UNON, VPON, VNON, WPON, and WNON for respective phases. The output drive controller 6 generates PWM signals UPWM, VPWM, and WPWM for controlling the currents of the output driver 7 and signals UHIZ, VHIZ, and WHIZ for turning off outputs, based on the output signals UPON, UNON, VPON, VNON, WPON, and WNON of the decoder 5, the output IS of the current detector 8, and the current instruction. The output driver 7 drives the three-phase DC motor 1, based on the output signals UPWM, UHIZ, VPWM, VHIZ, WPWM, and WHIZ of the output drive controller 6. The sequencer 9 controls the entire circuit, e.g., the switching of a non-conducting phase, the latching of a polarity detection result, decode timing, and the like.

Figure 2:
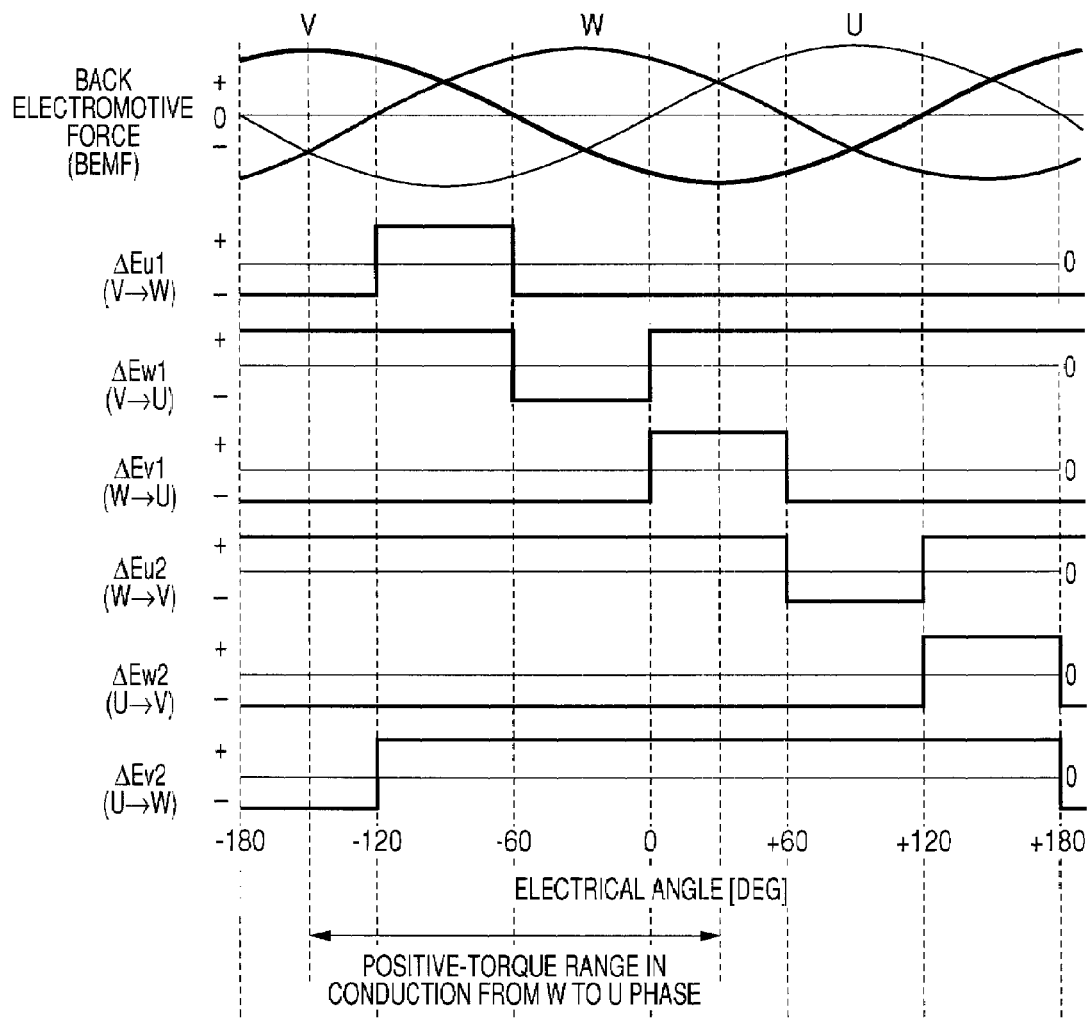
FIG. 2 is an explanatory diagram illustrating a motor startup method according to the invention.

FIG. 2 is an explanatory diagram illustrating a motor startup method according to the invention. In FIG. 2, the relationship among changes in induced voltages Eu, Ev, Ew and back electromotive forces (BEMF) for detecting a rotor position is shown. A phase on which the detection of an induced voltage in an energized state can be performed is limited. For example, when a current is passed from the W phase to the V phase, voltages induced in the U phase can be detected, so that voltages (Vm−) indicated by triangle marks in FIG. 11 can be detected. When a current is passed from the V phase to the W phase, voltages (Vm+) indicated by black square marks in FIG. 11 can be detected.

Figure 10:
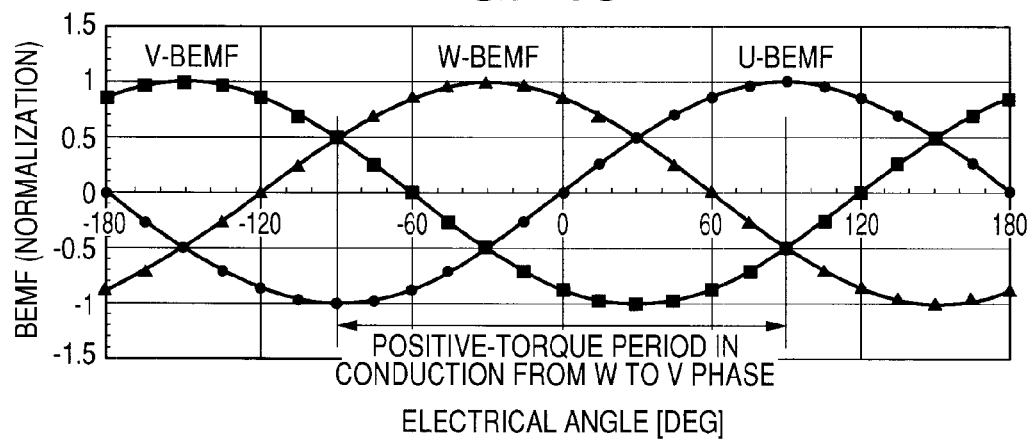
FIG. 10 is a waveform diagram showing back electromotive forces in FIGS. 9A and 9B.
Figure 11:
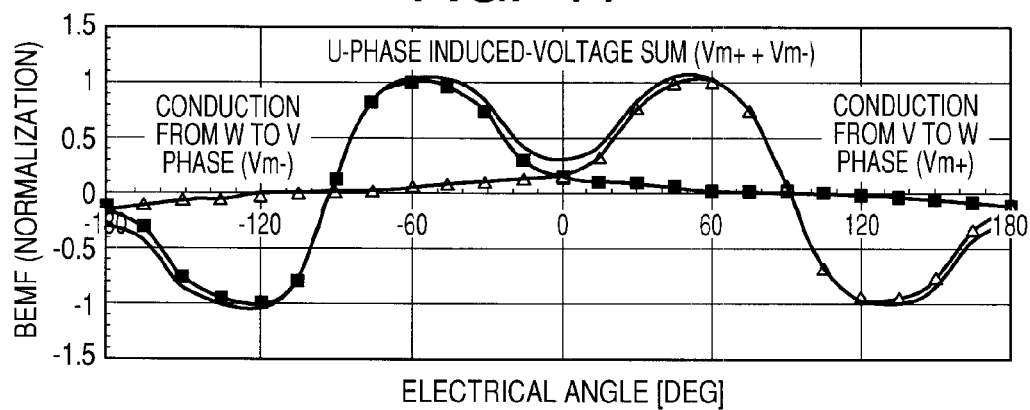
FIG. 11 is a waveform diagram showing induced voltages in FIGS. 9A and 9B.
Figure 12:
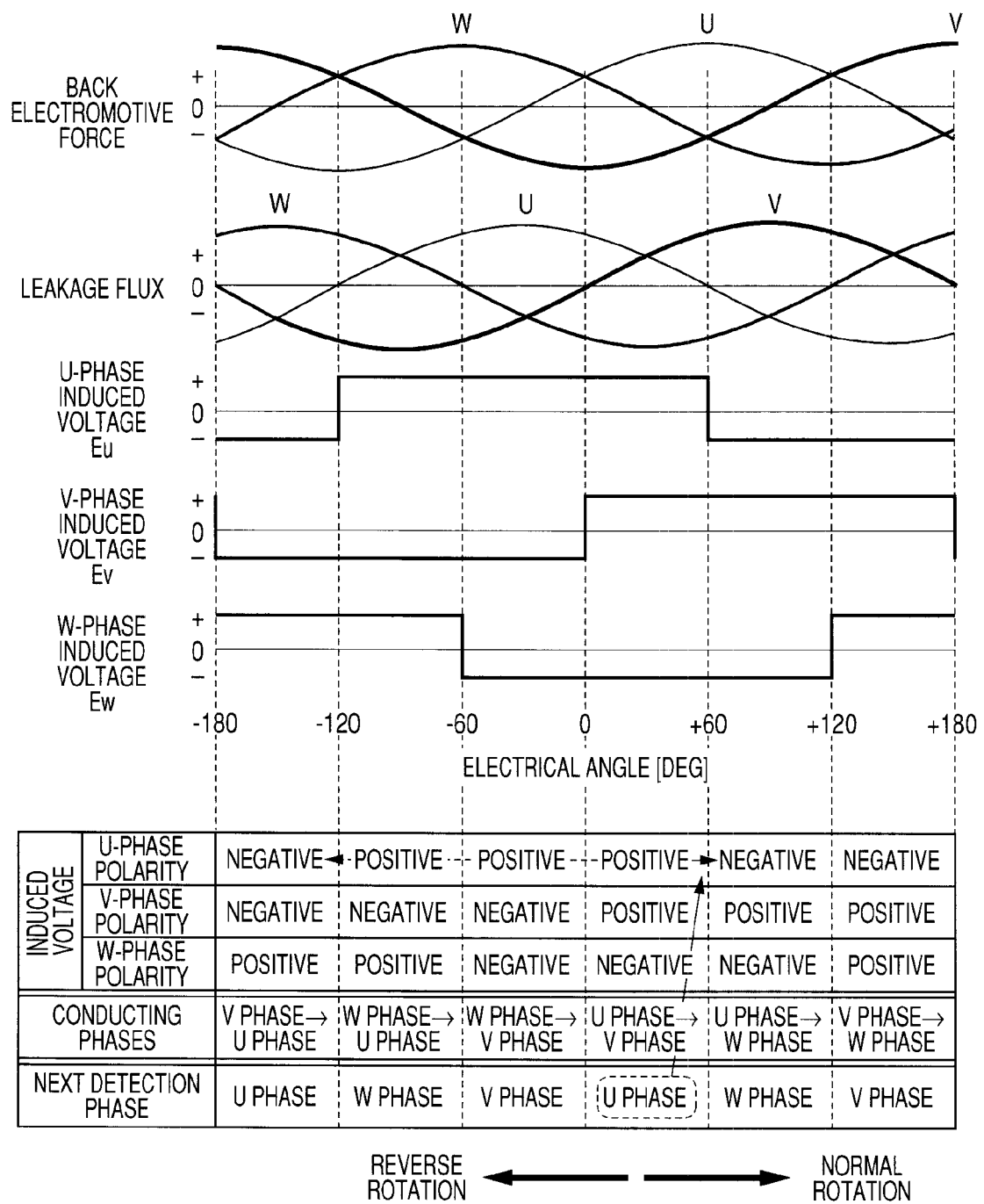
FIG. 12 is an explanatory diagram summarizing the back electromotive forces in FIG. 10 and the induced voltages in FIG. 11.

In FIG. 10, a period in which a positive torque occurs when a current is passed from the W phase to the V phase is a period corresponding to −90 to +90 electrical degrees in FIG. 11. The induced voltage Vm+ generated in the U phase has peaks at −120 degrees before this period and at −60 degrees within this period. Further, the induced voltage Vm− generated in the U phase has peaks at 60 degrees within this period and at 120 degrees after this period. The induced voltage (Vm+ or Vm−)

is detected every PWM, and each difference ΔEu1 to ΔEv2 from an induced voltage detected in the immediately preceding sampling is calculated, so that the relationship shown in FIG. 2 is obtained in each energization condition.

In FIG. 2, when a current is passed from the W phase to the V phase, the polarity of U-phase induced voltage change ΔEu2 switches at around +60 electrical degrees. The switching timing of the polarity of ΔEu2 corresponds to a peak of Eu. In response thereto, the current conducting phases are switched to the next conducting phases so that a current is passed from the U phase to the V phase. In this case, induced voltages in the W phase can be detected, and the polarity switching of induced voltage change ΔEw2 is determined. This operation is repeated to achieve a stable initial acceleration in a stopped state or a low rotation state in which a back electromotive force (BEMF) cannot be detected.

Figure 3:
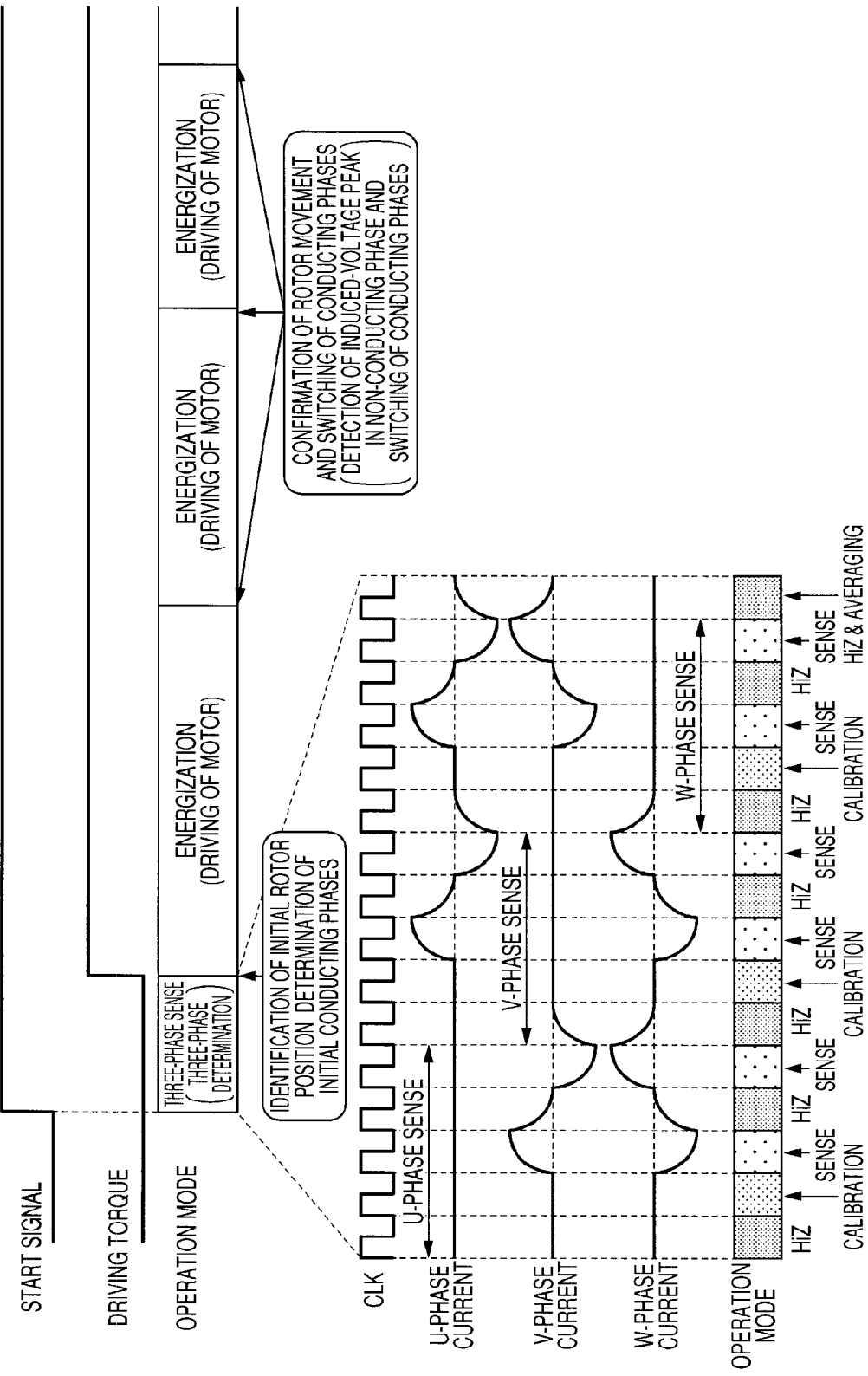
FIG. 3 is an operation timing diagram illustrating a motor initial-acceleration method according to the invention.
Figure 13:
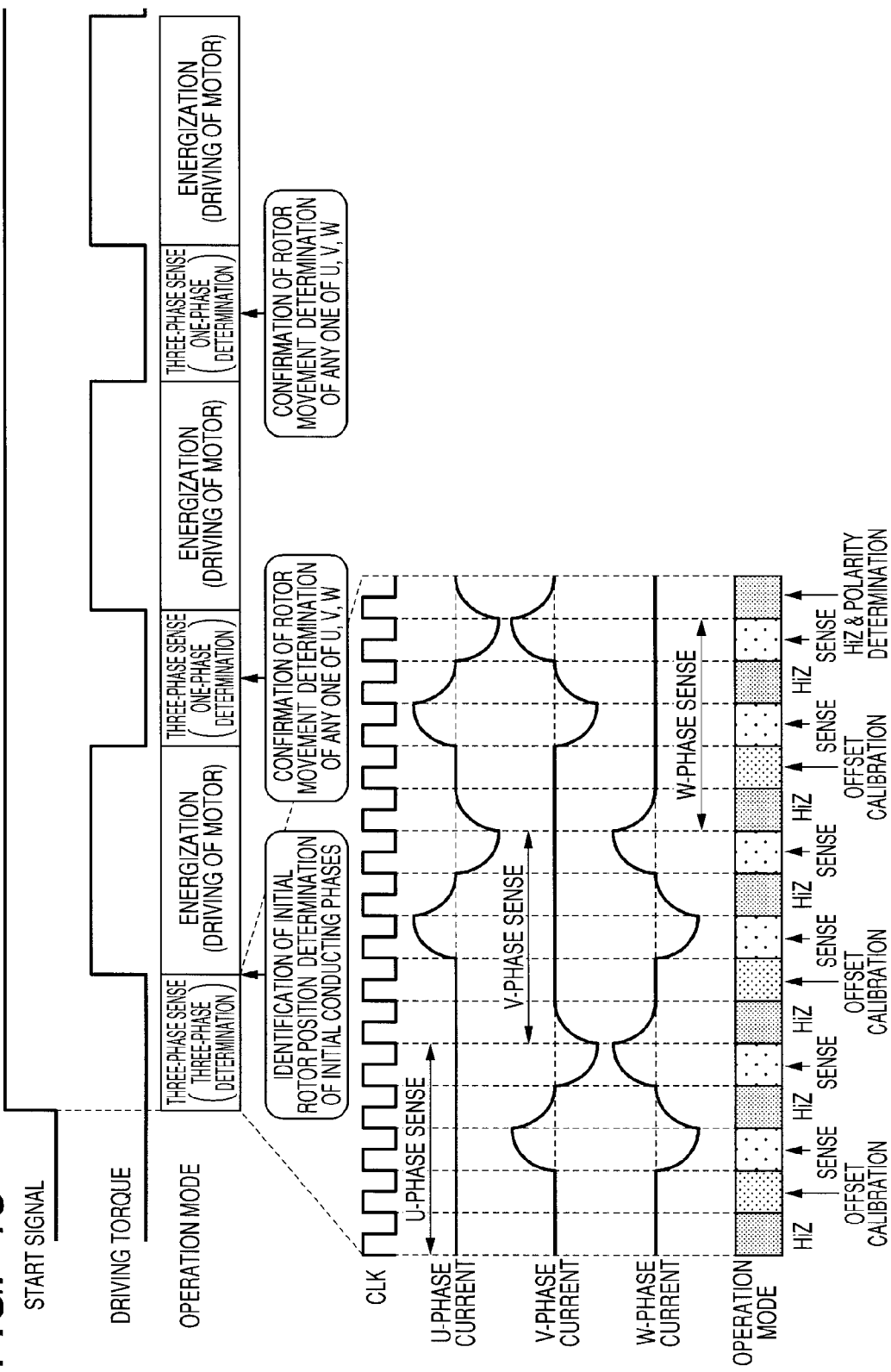
FIG. 13 is a timing diagram illustrating a conventional initial-acceleration operation.

FIG. 3 is an operation timing diagram illustrating a motor initial-acceleration method according to the invention. As shown in FIG. 13, when the start signal (Start) becomes a high level, induced voltages for the three phases are detected so that the position of the rotor is detected. For example, in the U-phase sense, first, an output high impedance state Hiz is established, and offset calibration is performed. Then, by passing a current from the V phase to the W phase, a U-phase induced voltage (Vm+) is sensed. An output high impedance state Hiz is established, and by passing a current from the W phase to the V phase, a U-phase induced voltage (Vm−) is sensed, thereby determining an induced voltage sum Eu. In the same way, induced voltages in the other phases V and W are sensed according to the procedure of performing Hiz, calibration, sense, Hiz, and sense, thereby determining induced voltage sums Ev and Ew, respectively.

The initial position of the rotor is identified by determining the polarities of the three-phase induced voltage sums Eu, Ev, and Ew, thus determining initial conducting phases. In accordance with the determination of the initial conducting phases, energization (driving of the motor) is started, thus starting to PWM-drive the motor 1. An induced voltage that occurs in a non-conducting phase by the effect of mutual induction during the PWM driving is detected. When a peak of induced voltages is detected, the conducting phases are switched. After the conducting phases are switched, a peak of induced voltages that appear in a non-conducting phase during the driving of the motor is continuously detected and used as a timing for phase switching to accelerate the motor. This makes it possible to detect a timing for phase switching while energization is being performed. Therefore, unlike the case of alternation between energization and three-phase sense as shown in FIG. 13, a periodical ripple does not occur in driving torque, which leads to reduction in motor noise. Although the first detection of induced voltages for the three phases is performed one time in this embodiment, it may be performed several times, in consideration of the stability and noise of the motor acceleration.

Figure 4:
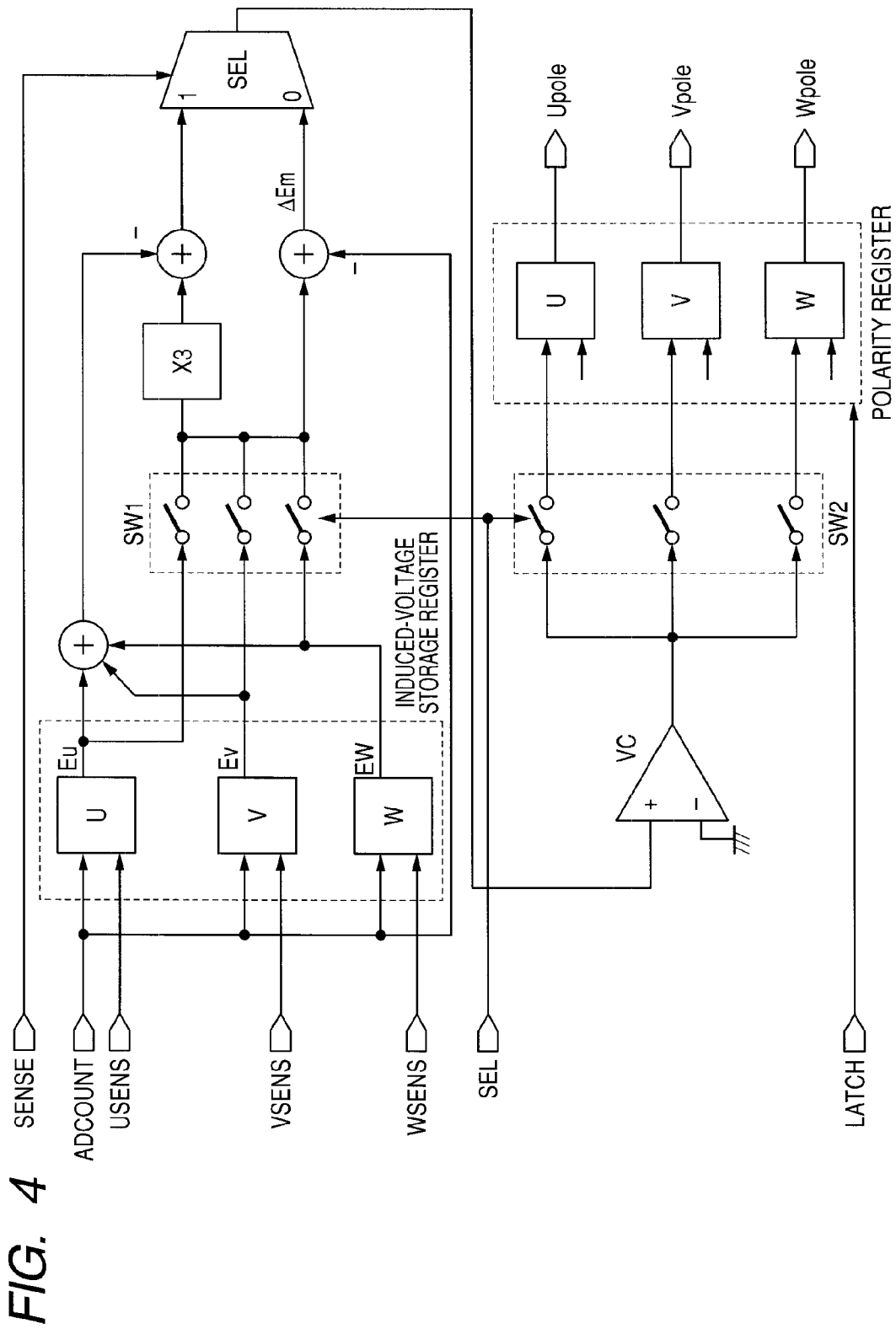
FIG. 4 is a block diagram of an induced-voltage determination unit according to the embodiment in FIG. 1.

FIG. 4 is a block diagram of the induced-voltage determination unit according to the embodiment in FIG. 1. The induced-voltage determination unit according to this embodiment stores ADCOUT obtained by converting a detected voltage induced in a non-conducting phase when a current is passed through any two phases into a digital signal by the ADC 3, in an induced-voltage storage register. The induced-voltage determination unit stores ADCOUT in a U-phase induced-voltage storage register U in accordance with a USENS signal during the detection of induced voltage in the U phase, stores ADCOUT in a V-phase induced-voltage storage register V in accordance with a VSENS signal during the detection of induced voltage in the V phase, and stores ADCOUT in a W-phase induced-voltage storage register W in accordance with a WSENS signal during the detection of induced voltage in the W phase.

In the case of obtaining induced voltage polarities for the three phases as in the three-phase sense period shown in FIG. 3, that is, in the identification of the initial rotor position, a SENSE signal is at a high level. In the case of determining the polarity of an induced voltage in the U phase by controlling a switch SW 1 with a SEL signal for example, using induced voltages Eu, Ev, and Ew stored in the induced-voltage storage registers, that is, in the case where the U phase is a non-conducting phase, Ea=3×Eu−(Eu+Ev+Ew) is calculated. The voltage Ea is equal to triple the result of subtracting the average of induced voltages from each-phase induced voltage. The polarity thereof is determined by a polarity determination comparator VC. The polarity determination results of the non-conducting U, V, W phases are stored in respective polarity registers U, V, and W in accordance with a LATCH signal, with a switch SW 2 being controlled by the SEL signal, and outputted as determination results Upole, Vpole, and Wpole.

In the case of detecting an induced voltage that appears in a non-conducting phase during energization in FIG. 3, the SENSE signal is at a low level. In the case of determining the polarity of an induced voltage in the U phase by controlling the switch SW 1 with a SEL signal for example, that is, in the case where the U phase is a non-conducting phase, ΔEm=ADCOUT−Eu is calculated. The ΔEm is equal to the difference between the immediately preceding sampled induced voltage and the current induced voltage. The polarity thereof is determined by the polarity determination comparator VC. A peak of induced voltages is detected by detecting the polarity switching. Peak detection results are also stored in the polarity registers U, V, W, as in the three-phase sense period, and the detection results Upole, Vpole, and Wpole are used to switch conducting phases.

Figure 5:
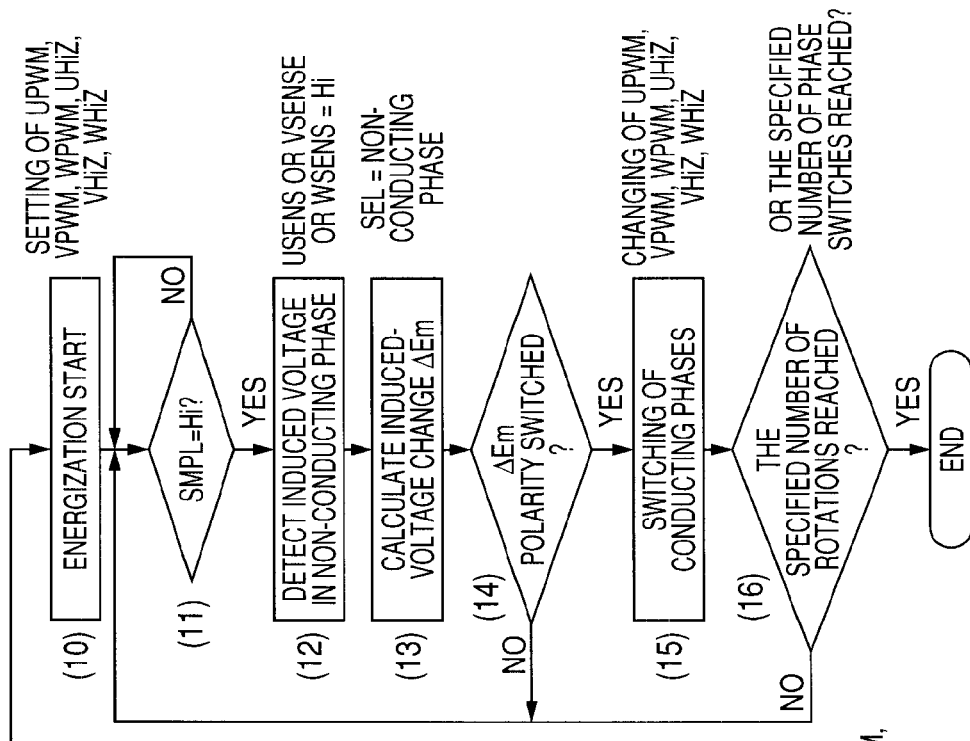
FIG. 5 is a flowchart illustrating the motor initial-acceleration method according to the embodiment of the invention.
Figure 5:
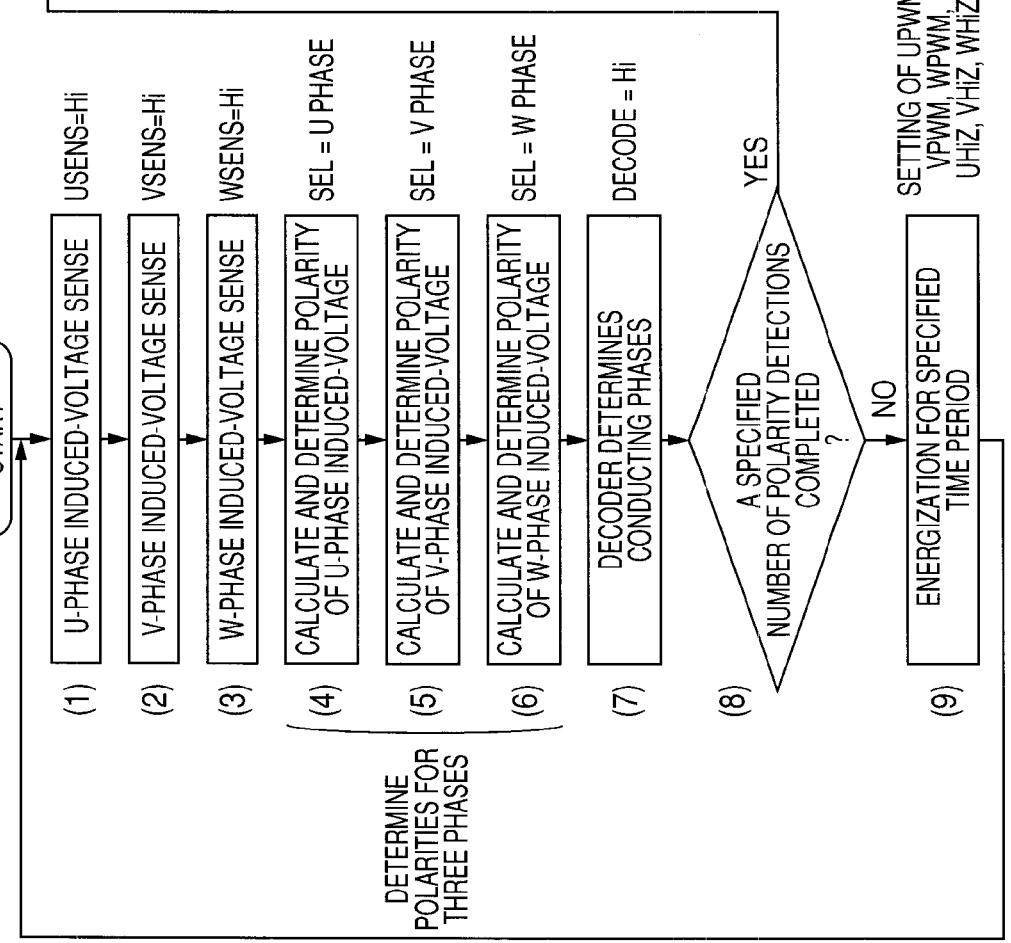

FIG. 5 is a flowchart illustrating the motor initial-acceleration method according to the embodiment of the invention. In steps (1) to (6), induced voltages are detected in the U phase, the V phase, and the W phase, and polarity calculation and determination for the three phases is performed. Based on the result, conducting phases are determined by the decoder. For example, in the U-phase induced-voltage sense in step 1, USENS=Hi (high level); in the V-phase induced-voltage sense in step 2, VSENS=Hi (high level); in the W-phase induced-voltage sense in step 3, WSENS=Hi (high level); and induced voltages Eu, Ev, and Ew are stored in the induced-voltage storage registers, respectively.

In step (4), SEL=U phase, so that the switches SW1 and SW2 select the U phase, the calculation of Ea=3×Eu−(Eu+Ev+Ew) is performed, and the polarity determination is performed by the comparator VC. In steps (5) and (6), similar operations are performed on the V phase and the W phase. In step (7), signal DECODE=Hi (high level) and conducting phases are determined by the decoder 5 shown in FIG. 1. Such determination of conducting phases is described in Japanese Unexamined Patent Publication No. 2001-275387, Japanese Unexamined Patent Publication No. 2004-140975, and Japanese Unexamined Patent Publication No. 2006-115599 in detail.

In step (8), if a specified number of polarity detections for the three phases have not been performed, the flow proceeds to step (9), where energization is performed through the conducting phases determined by the decoder for a specified time period. Thereafter, detection of induced voltages for the three phases is performed again. In the case where the specified number of detections is one as in the embodiment, the flow moves to step (10) immediately. In the case where a plural number of detections are specified, after the driving of the motor by the energization, the flow returns to step (1). Performing such an operation multiple times can confirm the normal rotation of the motor before switching to a driving method of detecting a peak of induced voltages described later, thereby making it possible to achieve stable motor startup.

After a specified number of polarity detections for the three phases are completed, in step (10) energization is started through the conducting phases determined by the decoder. In step (11) every time a SMPL signal becomes a high level, an induced voltage that appears in a non-conducting phase is detected in step (12). In step (13), a difference ΔEm from the immediately preceding sampled induced voltage is calculated. The flow returns to step (11) to detect an induced voltage until the polarity switches in step (14). If the polarity of ΔEm has switched in step (14), the conducting phases are switched in step (15). The operation is repeated until the specified number of rotations is reached in step (16). The end of the driving method of detecting a peak of induced voltages may be determined by the specified number of phase switches performed. Alternatively, the operation is repeated for a predetermined fixed time period. It is convenient to provide a register so that the arbitrary number of phase switches or rotations or an arbitrary time period can be set from the outside.

Figure 6:
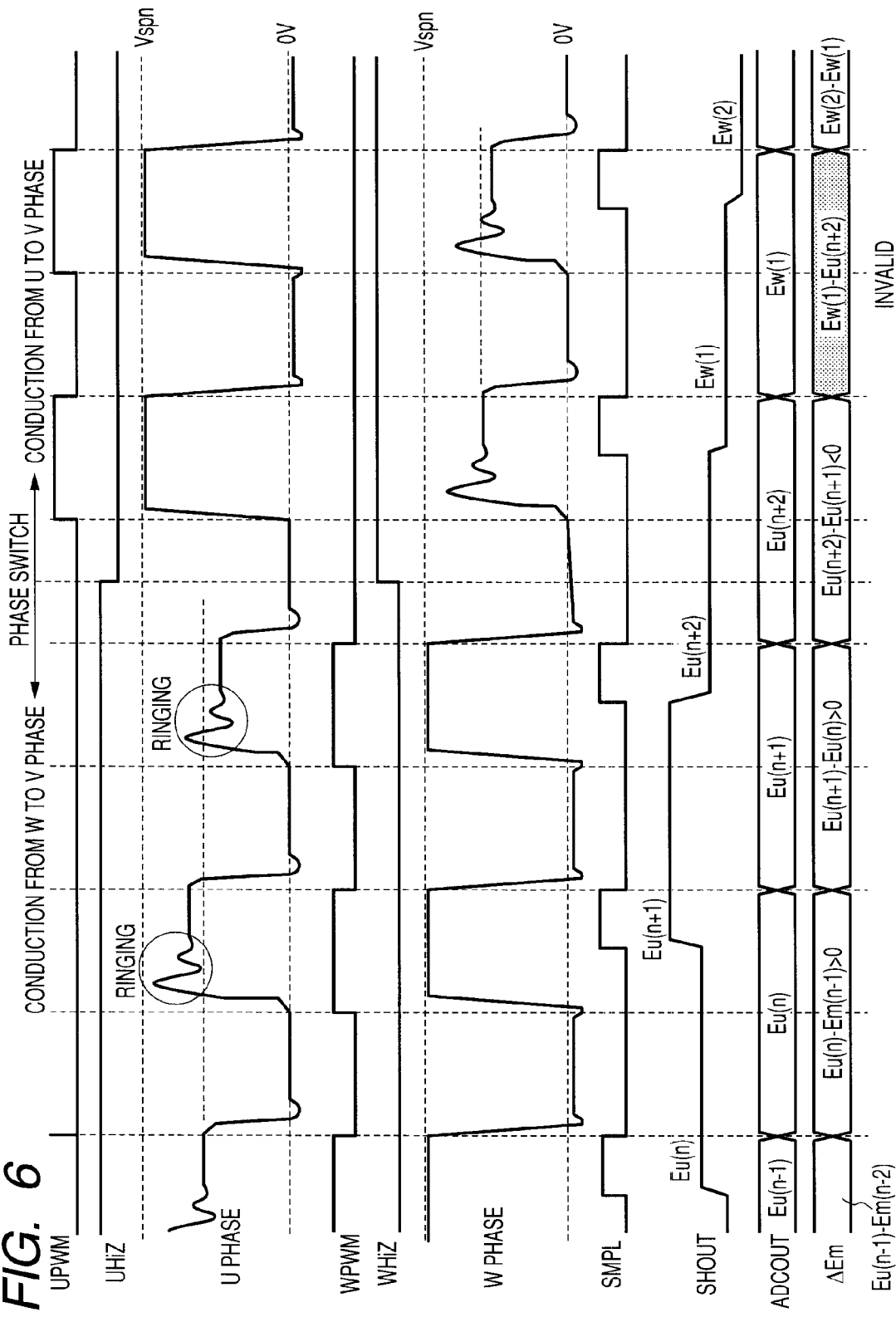
FIG. 6 is a diagram showing operation waveforms in detecting induced voltages during energization according to the invention.

FIG. 6 shows operation waveforms in detecting induced voltages during energization as in step (12) shown in FIG. 5. When a current is passed from the W phase to the V phase, WHIZ=Lo (low level) and a PWM signal is superposed on WPWM, so that the W-phase output is PWM operation. In the V phase (not shown); VHIZ=Lo, VPWM=Lo, and the lower power MOSFET is on, so that the V-phase output voltage is Lo (low level). At this time, the waveform of the U phase as a non-conducting phase is synchronized with the PWM operation of the W phase, and an induced voltage is detected in a PWM-on state, that is, in a state of WPWM=Hi. Since the voltage waveform of the U phase has a ringing on the rising edge due to the PWM on-off operation, a sample signal SMPL is generated so as to sample a latter half of the PWM signal.

A waveform SHOUT is obtained by sampling induced voltages in the non-conducting phase. The ADCOUT obtained by A-D converting the SHOUT is updated every PWM to Eu(n−1), Eu(n), Eu(n+1), Eu(n+2). When a difference ΔEm from the immediately preceding sampled induced voltage switches from positive to negative as shown in FIG. 6, the conducting phases are switched. After the phase switching, a current is passed from the U phase to the V phase. The first ΔEm after the switching is not used for polarity determination (invalid) because the immediately preceding sampled data is an induced voltage in a different phase. Thereafter, this operation is repeated to achieve the initial acceleration of the motor with stability and reduced startup noise. Thus, it becomes possible to reduce such startup noise as in the case of alternation between three-phase sense and energization shown in FIG. 13 and reach the predetermined number of rotations in a short time.

Figure 7:
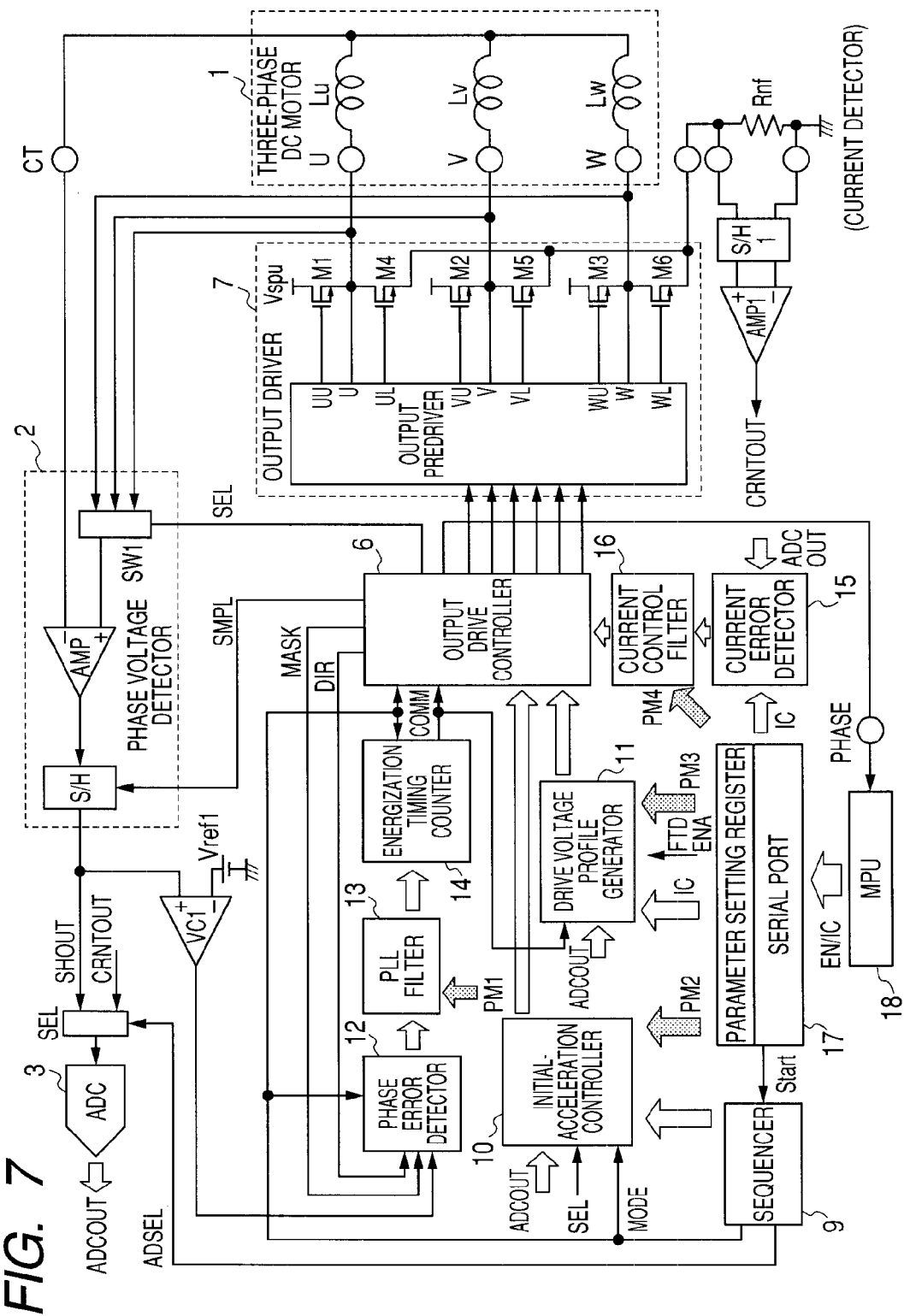
FIG. 7 is an entire block diagram showing the motor drive control device according to the embodiment of the invention.

FIG. 7 is an entire block diagram including the startup section of the motor drive control device according to the embodiment of the invention. Three-phase motor coils 1 are driven in a pulse width modulation (PWM) mode by the output driver 7 including an output predriver and an output stage composed of power devices such as power MOSFETs M1 to M6. The output predriver receives signals UPWM, VPWM, WPWM which are PWM-modulated by the output drive controller 6 in accordance with a sinusoidal drive voltage generated by a drive voltage profile generator 11 or conducting phases determined by the initial-acceleration controller 10 and signals UHIZ, VHIZ, WHIZ for turning off the output. The initial-acceleration controller 10 is configured with the induced-voltage determination unit 4 and the decoder 5 shown in FIG. 1.

In spindle output voltages U, V, and W, a non-conducting phase is selected by the switch (selector) SW1 of the phase voltage detector 2, and a difference voltage from the neutral point CT of the motor coils 1 is generated by the preamplifier AMP. The output of the preamplifier AMP is sampled and held by the sample-and-hold circuit S/H, in accordance with a SMPL signal. The output SHOUT is inputted to a selector SEL and a BEMF detecting comparator VC1. For the SHOUT signal, in the case where motor rotation speed is high, a back electromotive force (BEMF) is sufficiently large; however, in the case where the motor stops or rotates at low speed, a back electromotive force (BEMF) is very small, so that it is possible to observe the slope of a current by PWM operation and an induced voltage determined by the effect of mutual induction. Using this, in the present invention, the switching of conducting phases in accordance with rotor movement is performed, detecting the polarity of an induced voltage and a peak during the driving of the motor.

The sequencer 9 controls the operation of the entire motor drive control device (spindle driver) and, with a MODE signal, determines the operating condition of initial-acceleration control and PLL control of detecting a back electromotive force BEMF and driving the motor. In rotation less than the predetermined number of rotations, the initial-acceleration method according to the invention operates with the initial-acceleration controller 10 and the output drive controller 6. In the predetermined number of rotations or larger; with a PLL control loop composed of the BEMF detecting comparator VC1, a phase error detector 12, a phase-locked loop (PLL) filter 13, an energization timing counter 14, the output drive controller 6, the output driver 7, and the motor 1; a BEMF is detected to drive the motor.

The drive voltage profile generator 11 generates a sinusoidal drive voltage at the time of detecting a back electromotive force BEMF and driving the motor. This achieves the driving of the motor with a small ripple and substantially constant torque, thereby reducing noise during the driving of the motor. The current detector Rnf(8) detects a motor drive current. The voltage detected by the current detector Rnf is amplified by a sense amplifier AMP1 through a sample-and-hold circuit S/H1, and the amplified signal is inputted to the ADC 3 through the selector SEL. A current control error detector 15 calculates an error, based on an A-D converted detection value ADCOUT and a current instruction IC. With a current control loop composed of a current control filter 16, the output drive controller 6, the output driver 7, and the motor 1, the drive current is controlled.

The sequencer 9 also generates an ADSEL signal to control the switching between A/D conversion for drive current control and A/D conversion for induced voltage detection. The ADC 3 is used for both the drive current detection and the induced voltage detection, in a time-division manner. For motor speed control, a periodic signal PHASE proportional to the number of rotations is outputted from the output drive controller 6, which is compared with a target speed by a microprocessor (MPU) 18, so that a current instruction IC according to a speed is inputted. The microprocessor (MPU) 18 is interfaced through a serial port, and various parameters such as a current instruction, current control, PLL, constant torque drive, and initial-acceleration control are set by a register. The above blocks can achieve a system for driving the spindle motor from a stopped state to steady rotation, with stability and low noise.

Figure 8:
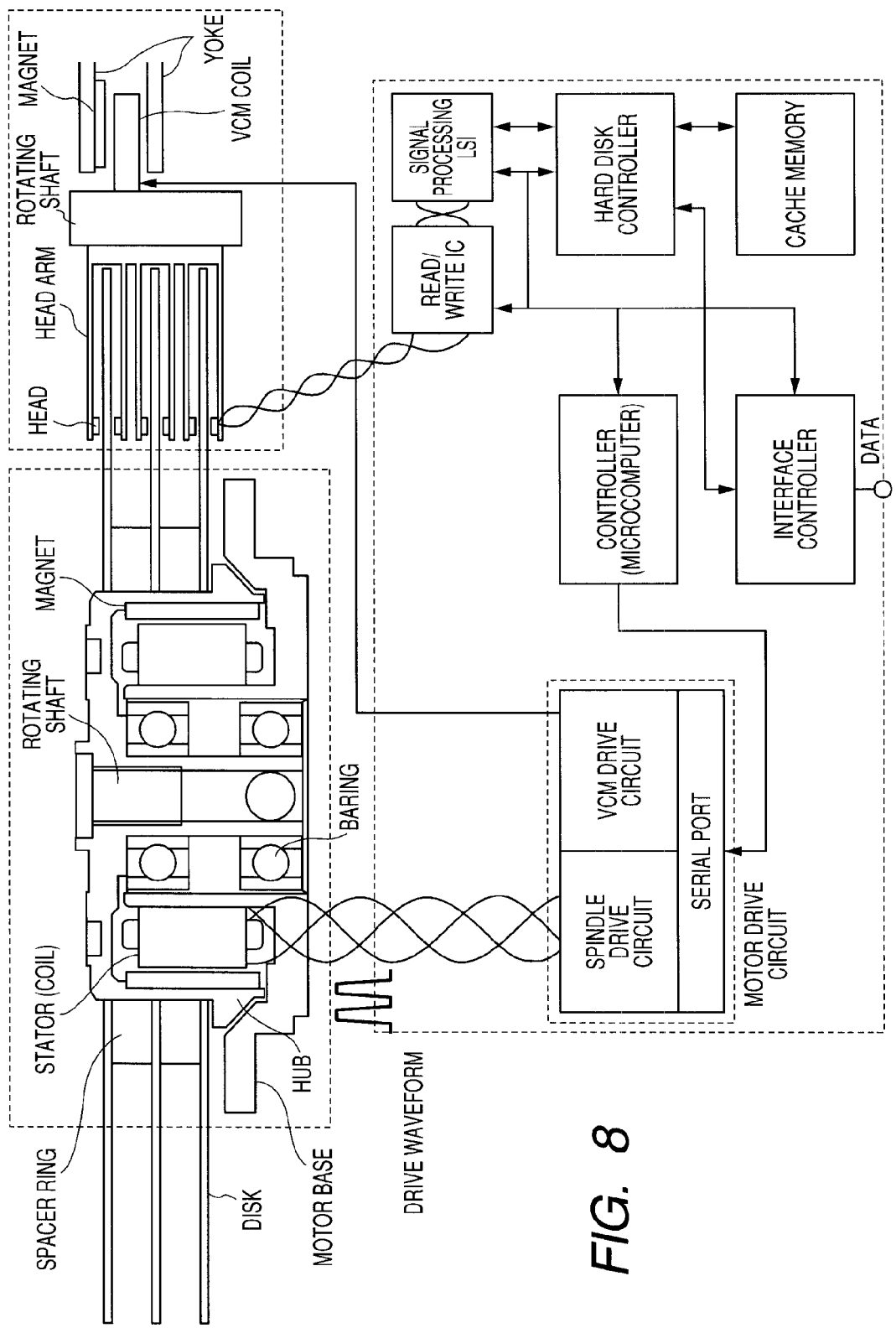
FIG. 8 is a structural view of a hard disk drive including the motor drive control device according to the embodiment of the invention.
Figure 9A:
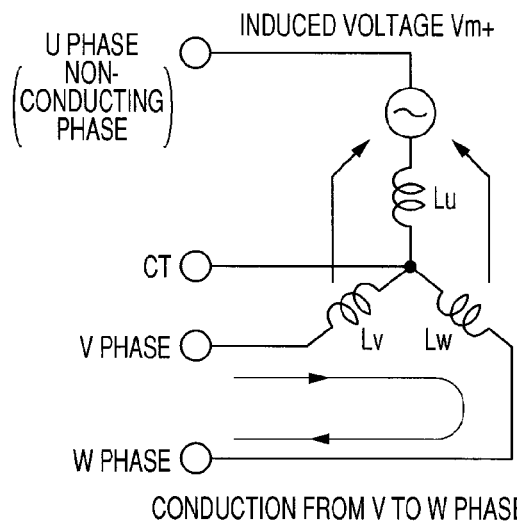
FIGS. 9A and 9B are equivalent circuit diagrams illustrating a conventional motor startup method.
Figure 9B:
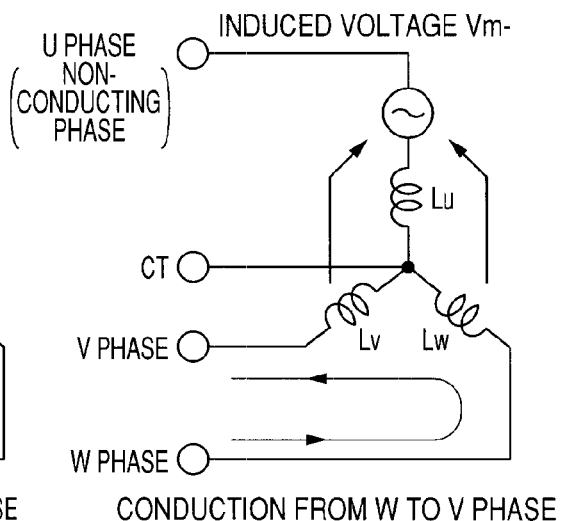

FIG. 8 is a structural view of a hard disk drive (HDD) including the motor drive control device according to the embodiment of the invention. The hard disk drive is configured with a voice coil motor control system, a magnetic head drive control system, and a three-phase spindle motor control system according to the invention. In order to achieve high-density packaging and miniaturization of a mechanical section, a three-phase spindle motor includes a coil as a stator and a magnet as a rotor inside a hub for holding a disk to rotate the disk about a rotating shaft.

A VCM obtains rotation thrust by passing current with a magnet and a VCM coil to move a head. A motor drive control circuit is composed of a semiconductor integrated circuit in which a spindle motor drive control circuit having the function as described in the embodiment and a voice coil motor drive control circuit for moving the magnetic head in a radial direction of the disk are integrated. The motor drive control circuit controls the voice coil motor and the spindle motor, in accordance with a control signal supplied through a serial port from a microcomputer (MPU).

A read/write IC amplifies a current according to a magnetic variation detected by the magnetic head (including an MR head) and sends a read signal to a signal processing LSI (data channel processor). The read/write IC also amplifies a write pulse signal from the signal processing LSI and outputs a magnetic head drive current. The signal processing LSI performs signal processing such as modulation/demodulation suited to digital magnetic recording and waveform shaping according to magnetic recording characteristics, and reads position information from a read signal of the magnetic head. A hard disk controller fetches read data sent from the signal processing LSI and performs error correction. The hard disk controller also performs error correction encoding on write data from a host and outputs it to the signal processing LSI. An interface controller transfers data between this system and an external device and controls the data. The hard disk controller is coupled through the interface controller to a host computer such as a microcomputer in a personal computer.

A cache memory is used as a buffer for temporarily storing data read at high speed from the magnetic disk. A controller composed of a microcomputer determines an operation mode based on a signal from the hard disk controller, and controls each unit of the system in accordance with the operation mode. The controller also determines a sector position based on address information supplied from the hard disk controller.

In the hard disk drive (HDD), startup noise can be reduced by using the motor drive control device according to the embodiment. Further, the hard disk drive can be started up at high speed to the predetermined number of rotations which enables read/write operation. That is, since the switching of conducting phases is performed by detecting a peak of induced voltages during the energization of the motor, it is not necessary to provide a period for detection of only induced voltages, thereby making it possible to reduce torque ripple. The reduction in torque ripple can reduce noise during motor startup. The unnecessity of the period for detection of induced voltages reduces periods of no torque, thereby making it possible to reduce motor startup time while ensuring the stability of startup. Particularly, as described above, in an application where startup and stop of the motor are alternated frequently, a use in a relatively quiet environment, and a use in a hand-held device used close to a user's ear, such grating noise at motor startup can be advantageously prevented.

While the invention made above by the present inventors has been described specifically based on the illustrated embodiment, the present invention is not limited to the embodiment. It is needless to say that various changes and modifications can be made thereto without departing from the spirit or scope of the invention. For example, in the motor drive control circuit according to the embodiment, the description has been made with reference to the circuit for driving and controlling the three-phase motor as an example; however, the invention can be applied to polyphase DC motors other than the three-phase motor. Further, in the embodiment, the peak detection is performed by converting an induced voltage into a digital value. However, the peak detection may be performed in an analog manner, with an integration circuit provided. Further, in order to avoid false detection due to noise or the like, the peak detection may be performed based on a value obtained by summing several sample values of an induced voltage. The invention utilizes mutual induction which is a characteristic of the motor, and therefore can be widely used in a motor drive control device and a motor startup method for driving a brushless motor such as a motor for rotating the polygon mirror of a laser beam printer or a motor for an axial flow fan, a fan motor, and an optical disk.

What is claimed is:

1. A motor drive control device comprising:
an output stage including upper and lower power MOSFETs and a spindle output predriver, for driving a polyphase DC motor;
a current detector for detecting a current flowing through the polyphase DC motor;
an output drive controller which outputs a PWM signal desired in such a manner that a current instruction signal and the current detected by the current detector coincide with each other;
a phase voltage detector for the polyphase DC motor; and
an initial-acceleration controller,
wherein the initial-acceleration controller is activated at start-up and performs initial acceleration of the polyphase DC motor by detecting a peak of voltages induced in a non-conducting phase depending on a slope of a phase current for driving the polyphase DC motor by the PWM signal and by performing switching control of a conducting phase, and
wherein after the initial acceleration, a position of a rotor is detected based on a back electromotive force in each phase which is generated by rotation of the polyphase DC motor through the phase voltage detector, whereby rotation control is performed by the output drive controller.

2. The motor drive control device according to claim 1, wherein an induced voltage in the non-conducting phase is sampled at a predetermined sampling frequency into a digital signal, and a digital signal corresponding to an immediately preceding sampling timing and the current digital signal are compared in amplitude to detect a peak value.

3. The motor drive control device according to claim 2, wherein a result of comparison in amplitude between digital signals of different phases immediately after the phase switching is not used to detect a peak value.

4. The motor drive control device according to claim 1, wherein prior to the initial acceleration of the polyphase DC motor in which a peak of induced voltages is detected and switching control of a conducting phase is performed, such a current that the rotor does not react is passed through any two phase coils of the polyphase DC motor in succession, a polarity of a voltage induced in the non-conducting phase is detected, phase coils through which a current should be passed to rotate the rotor and the direction of energization are determined, and a current is passed in accordance with the determination to start up the motor.

5. The motor drive control device according to claim 1, wherein the initial acceleration of the polyphase DC motor in which a peak of induced voltages is detected and switching control of a conducting phase is performed is carried out for a predetermined fixed time period.

6. The motor drive control device according to claim 1, wherein the initial acceleration of the polyphase DC motor in which a peak of induced voltages is detected and switching control of a conducting phase is performed is carried out for a time period corresponding to a predetermined rotation speed or smaller.

7. The motor drive control device according to claim 1, wherein the initial acceleration of the polyphase DC motor in which a peak of induced voltages is detected and switching control of a conducting phase is performed is carried out for a time period corresponding to the predetermined number of rotations or smaller.

8. The motor drive control device according to claim 5, further comprising a register in which the fixed time period is set.

9. The motor drive control device according to claim 6, further comprising a register in which the rotation speed is set.

10. The motor drive control device according to claim 7, further comprising a register in which the number of rotations is set.

11. A motor startup method comprising:
   an output stage including upper and lower power MOS-FETs and a spindle output predriver, for driving a polyphase DC motor;
   a current detector for detecting a current flowing through the polyphase DC motor;
   an output drive controller which outputs a PWM signal desired in such a manner that a current instruction signal and the current detected by the current detector coincide with each other;
   a phase voltage detector for the polyphase DC motor; and
   an initial-acceleration controller,
   wherein the initial-acceleration controller is activated at start-up and performs initial acceleration of the polyphase DC motor by detecting a peak of voltages induced in a non-conducting phase depending on a slope of a phase current for driving the polyphase DC motor by the PWM signal and by performing switching control of a conducting phase.

12. The motor startup method according to claim 11, wherein after the initial acceleration, a position of a rotor is detected based on a back electromotive force in each phase which is generated by rotation of the polyphase DC motor through the phase voltage detector, and rotation control is performed by the output drive controller.

13. The motor startup method according to claim 11, wherein prior to the initial acceleration of the polyphase DC motor in which a peak of induced voltages is detected and switching control of a conducting phase is performed, such a current that the rotor does not react is passed through any two phase coils of the polyphase DC motor in succession, a polarity of a voltage induced in the non-conducting phase is detected, phase coils through which a current should be passed to rotate the rotor and the direction of energization are determined, and a current is passed in accordance with the determination to start up the motor.

* * * * *